Jan. 8, 1952   J. E. FELDMAN ET AL   2,582,022
MOLD PART AND FASTENING MEANS
Filed April 10, 1948
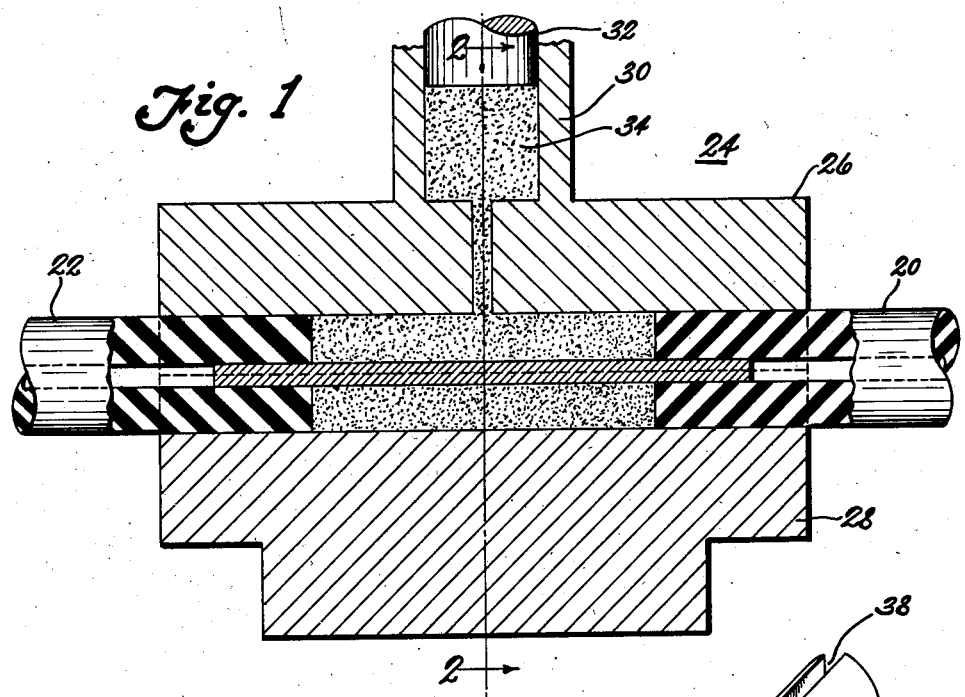
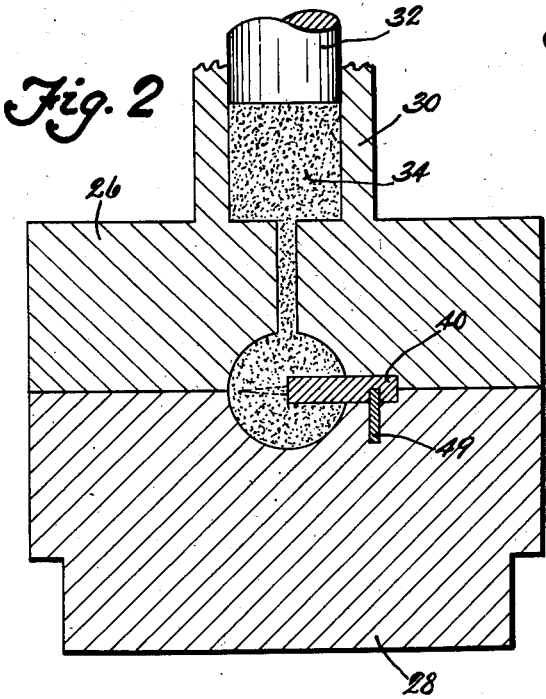
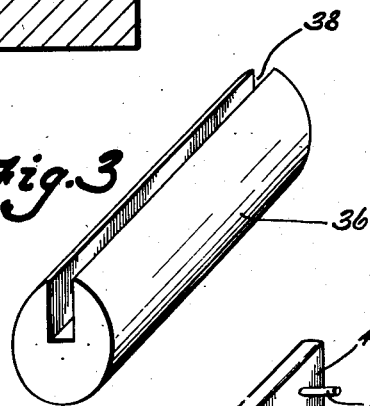
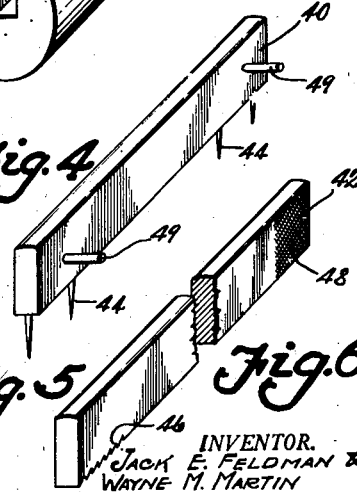
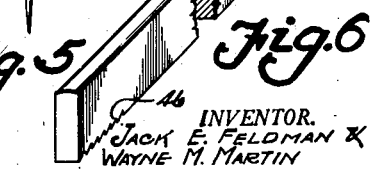
INVENTOR.
JACK E. FELDMAN &
WAYNE M. MARTIN
BY
their Attorneys Patented Jan. 8, 1952

2,582,022

UNITED STATES PATENT OFFICE 2,582,022

MOLD PART AND FASTENING MEANS

Jack E. Feldman and Wayne M. Martin, Dayton, Ohio, assignors to General Motors Corporation, Detroit, Mich., a corporation of Delaware Application April 10, 1948, Serial No. 20,296

3 Claims. (Cl. 18—36)

This invention relates to an apparatus and method for making joints between rubber-like members wherein a simultaneous molding step is required.

A method for making such a joint is shown and described in the Herman E. Wening application, Serial No. 660,897, filed April 10, 1946, now abandoned, wherein a process is disclosed for joining rubber-like windshield strips by placing the ends of a vulcanized windshield strip in a mold in spaced relation and then extruding an unvulcanized rubber-like material into the space therebetween. After curing, the joint is a vulcanized rubber-like material secured to the ends of the strip and of a similar configuration.

The method is one of considerable commercial value since previous methods of joining strips of complex configurations have failed to be completely satisfactory in most cases.

It is therefore an object of the present invention to provide a method and apparatus for making joints of the character described in a more facile manner.

Particularly, it is an object of the invention to provide a mold part to be utilized in the molding of the joint, which part also acts as a fastening means for preventing relative motion of the parts to be joined and for simultaneously holding them in the desired spaced relation.

Further objects and advantages of the present invention will be apparent from the following description, reference being had to the accompanying drawing, wherein preferred embodiments of the present invention are clearly shown.

In the drawing:

Fig. 1 is a view in section of a mold and extrusion cylinder used in the manufacture of joints of the character desired.

Fig. 2 is a section taken on line 2—2 of Fig. 1.

Fig. 3 is a view in perspective of a portion of one type of strip which may be joined.

Fig. 4 is a view of one type of mold part and fastener as provided under the teachings of the invention herein.

Fig. 5 is a view of another type of mold part and fastener.

Fig. 6 is a view of still another type of mold part and fastener.

In the manufacture of joints as described in the Wening application, the ends of one or more strips of rubber-like material 20 and 22 are placed within a separable mold 24 having an upper section 26 and a lower section 28. The ends 20 and 22 are spaced from one another and the joint is made by extruding unvulcanized rubber-like material into this space between the ends, preferably by means of an extrusion cylinder shown diagrammatically at 30. Upon downward travel of piston 32, the rubber-like material 34 within the cylinder 30 is transferred or forced into the space between the strip ends 20 and 22 to completely fill the space and to conform to any shape or configuration of the mold. The mold is then heated by suitable means to effect a cure of this unvulcanized rubber-like material. During this process an integral joint is formed between the ends 20 and 22 which will have a configuration of the remainder of the strip for example as shown at 36 in Fig. 3 wherein the strip 36 has a longitudinal groove 38 passing therethrough.

Under the teachings of the Wening application, the configuration of the strip is formed by portions within the mold and the groove 38 would therefore be formed by an integral core positioned in the mold.

It has been found that during extruding, due to the high pressure, the ends 20 and 22 are sometimes forced outwardly, thereby making it necessary to provide external clamping means to prevent such movement of the strip ends. These external clamping means are not only expensive but require manipulation after the strip ends are in position. Furthermore, it is necessary to have a different mold for each type of strip.

We have found that many strips have the same outside configuration and only differ in the shape of their cross section or grooves, such as at 38. For this reason, we have discovered that a single mold may be used for all of these similarly contoured strips provided mold inserts can be used to form the cored portions of the newly molded joint sections. One of these inserts is shown at 40 and another at 42 in Figs. 4, 5 and 6. These inserts can be placed in the grooved sections 38 of the ends of the strip and in effect form a core within the portion of the mold that is to be filled with unvulcanized rubber material. The insert 40 or 42 performs a second and very important function of a fastening or holding means. We have found that these inserts may be provided with means, such as pins 44, teeth 46 or knurled portions 48 which grip and hold the ends of the strips 20 and 22 when the inserts 40 or 42 are in position in a closed mold and thereby prevent any relative movement of the strip ends during the extrusion process. The use of the pins, teeth or knurls are not objectionable since what marring is done on the strip is within the groove, which groove normally receives a pane of glass or an edge of the automobile part and therefore these mars are not apparent in the finished car.

The use of inserts such as 40 and 42 are very economical and permit the use of a similar extrusion mold for the joining of many different grooved types of similar contoured rubber-like strips, it being merely necessary to have a number of different inserts available.

Rubber-like material as disclosed herein may include any of the usual materials that are vulcanizable such as natural rubber, butadiene-styrene copolymers, butadiene-acrylo-nitrile copolymers, polychloroprene, etc., and the material used for the joint may be of any of the above which are compatible with the materials to be joined and which are in a vulcanizable condition.

The use of insert fasteners such as 40 and 42, has another function, namely they prevent compression of the rubber-like strip ends during extrusion. Even when these ends are held within the mold by external clamping means, the inherent resiliency of the material permits compression thereof during extrusion which causes a bump or unevenness on the molded point after removal from the mold. The inserts described herein prevent any relative movement of the strip ends and thus provide a better appearing joint while simultaneously eliminating the necessity for external clamping means.

In some cases pins 49 may be provded on the inserts for aiding in positioning and holding the inserts in the mold.

While the embodiments of the present invention as herein disclosed, constitute preferred forms, it is to be understood that other forms might be adopted, all coming within the scope of the claims which follow.

What is claimed is as follows:

1. A mold assembly for molding a cored joining section of rubber-like material joining two spaced end portions of previously molded rubber-like members, comprising: a divided mold having a mold cavity for receiving said two end portions in spaced relation therein so that said end portions form cavity walls for the remaining portion of said cavity wherein said joining section is molded, and a removable core for forming a cored void in said joining section, the opposed ends of said core extending into the rubber-like material of said spaced end portions and having fastening means projecting from the core member and arranged so as to be embedded into the material of each of said spaced end portions for holding said spaced end portions in predetermined spaced position in the mold cavity, said core being removable from the divided mold together with the joined end portions as a unit after the molding operation is completed.

2. The mold assembly as claimed in claim 1 wherein said fastening means on said core comprises projecting pins.

3. The mold assembly as claimed in claim 1 wherein said fastening means on said core comprises saw-tooth-like projections.

JACK E. FELDMAN.
WAYNE M. MARTIN.

REFERENCES CITED

The following references are of record in the file of this patent:

UNITED STATES PATENTS

| Number | Name | Date |
| --- | --- | --- |
| 1,513,086 | Bruck | Oct. 28, 1924 |
| 1,668,390 | Auman | May 1, 1928 |
| 1,703,312 | Losey et al. | Feb. 26, 1929 |
| 2,079,393 | Benge | May 4, 1937 |
| 2,411,398 | Wallace | Nov. 19, 1946 |